United States Patent [19]
Yabe

[11] 4,039,366
[45] Aug. 2, 1977

[54] APPARATUS FOR BUILDING GREEN TIRES

[75] Inventor: Toshinori Yabe, Kodaira, Japan

[73] Assignee: Bridgestone Tire Company Limited, Tokyo, Japan

[21] Appl. No.: 625,157

[22] Filed: Oct. 23, 1975

[30] Foreign Application Priority Data
Oct. 25, 1974  Japan .............................. 49-123179

[51] Int. Cl.² ..................... B29H 17/18; B29H 17/37
[52] U.S. Cl. .................................. 156/405; 156/126; 156/413
[58] Field of Search .................. 156/126–129, 156/123, 133, 394 R, 396, 405, 408–413, 415, 416, 421

[56] References Cited

U.S. PATENT DOCUMENTS

| | | | |
|---|---|---|---|
| 1,080,683 | 12/1913 | Edmonds | 156/413 |
| 2,339,551 | 1/1944 | Stevens | 156/413 |
| 3,063,491 | 11/1962 | Mitchell | 156/127 |
| 3,364,093 | 1/1968 | Porter | 156/410 |
| 3,475,254 | 10/1969 | Henley | 156/123 |
| 3,535,188 | 10/1970 | Mallory et al. | 156/413 |
| 3,819,449 | 6/1974 | Caretta | 156/128 |
| 3,865,670 | 2/1975 | Habert | 156/126 X |
| 3,976,532 | 8/1976 | Barefoot | 156/96 |

FOREIGN PATENT DOCUMENTS

| | | | |
|---|---|---|---|
| 239,897 | 7/1962 | Australia | 156/126 |

*Primary Examiner*—Charles E. Van Horn
*Assistant Examiner*—John E. Kittle

[57] ABSTRACT

Method and apparatus for building green tires, wherein stitching means is mounted on a carrier which transfers a tire component to and around the circumference of another tire component laid on a tire building drum. The carrier in the form of a ring shape is adapted to be axially movable toward and away from the circumference of the tire building drum and has holding means for releasably holding a tire component and a green tire. The stitching means stitches the tire components together on the tire building drum while the carrier is surrounding the circumference of the tire building drum.

3 Claims, 16 Drawing Figures

APPARATUS FOR BUILDING GREEN TIRES

The present invention relates to a method and apparatus for producing green tires, and more particularly to a green tire building method and apparatus having stitching means mounted on a carrier which transfers a breaker and a tread to a tire building position.

In building green tires, it is known in the art to employ an apparatus having a carrier which is movable toward and away from a tire building drum in the axial direction thereof to place annular breakers one by one on and around the circumference of a carcass on the tire building drum. In such an apparatus, a stitching mechanism which stitches together the breaker and carcass is usually provided separately and independently of the tire building apparatus and thus incapable of carrying out the stitching operatin while the carrier is in the vicinity of the stitching mechanism, causing as a result considerable losses of operational time per unit tire.

It is, therefore, an object of the present invention to eliminate the above-mentioned drawback of the conventional tire building apparatus.

It is a more specific object of the invention to provide a method and apparatus which have a stitching mechanism mounted on a carrier which transfers a breaker and a tread to and around the circumference of a carcass on a tire building drum, thereby allowing the stitching operation to proceed immediately without moving the carrier away of the stitching mechanism. The mounting of the stitching mechanism on the carrier can greatly contribute to reducing the operational time per unit tire.

According to one aspect of the present invention, there is provided a method of building green tires, comprising the steps of preparing a tire building drum and a carrier movable toward and away from an operating position where the carrier surrounds the circumference of the tire building drum; transferring a tire component by the carrier to and around the circumference of another tire component which is applied around the tire building drum; shaping and assembling the tire components on the tire building drum; stitching together the tire components on the tire building drum to produce a green tire while the carrier is in the operating position; and removing the green tire out of the tire building drum and transferring the same to an ejecting position by the carrier.

According to another aspect of the present invention, there is provided an apparatus for putting into practice the method described above, the apparatus comprising: a tire building drum rotatably mounted on a housing and driven for rotation by a motor accommodated in the housing; a carrier movable toward and away from an operating position where the carrier surrounds the circumference of the tire building drum, the carrier having means for releasably holding a tire component and a green tire; and stitching means mounted on the carrier to stitch tire components together on the tire building drum while the carrier is in the operating position.

The above and other objects, features and advantages of the invention will become apparent from the following description and appended claims, taken in conjunction with the accompanying drawings which show by way of example a preferred embodiment of the invention.

Figure 1:
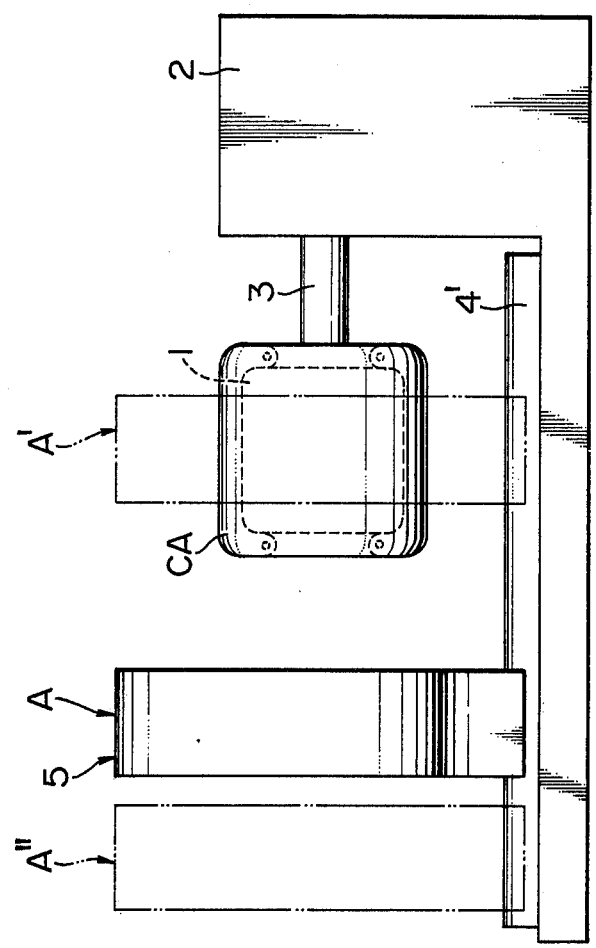
FIG. 1 is a diagrammatic front view of a green tire building apparatus embodying the present invention.
Figure 2:
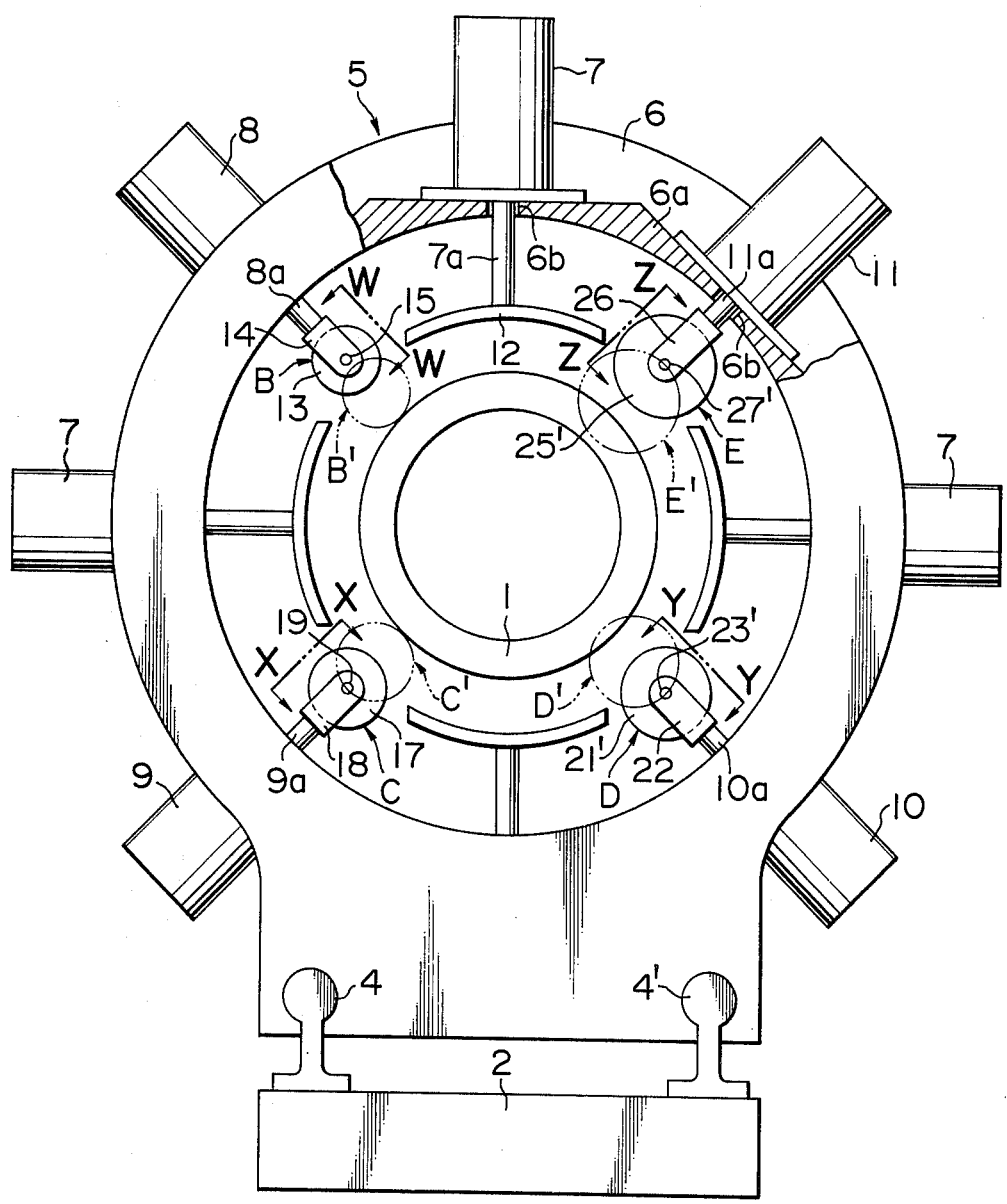
FIG. 2 is a side view of an enlarged scale of a carrier mechanism.
Figure 3A:
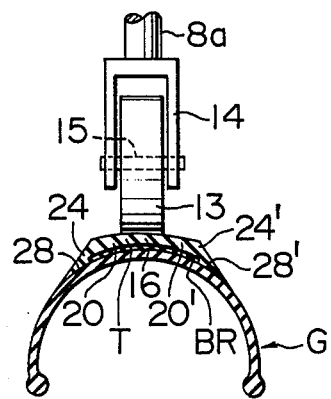
FIG. 3a is an enlarged cross-sectional view taken on line W—W of FIG. 2.
Figure 3B:
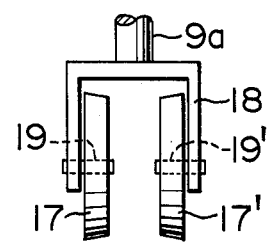
FIG. 3b is an enlarged cross-sectional view taken on line X—X of FIG. 2.
Figure 3C:
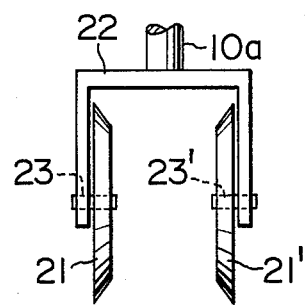
FIG. 3c is an enlarged cross-sectional view taken on line Y—Y of FIG. 2.
Figure 3D:
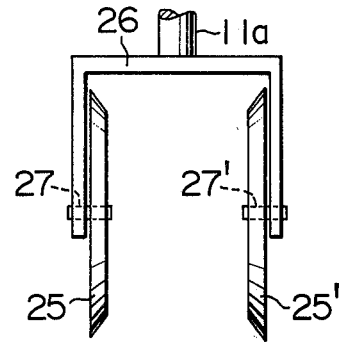
FIG. 3d is an enlarged cross-sectional view taken on line Z—Z of FIG. 2.
Figure 4A:
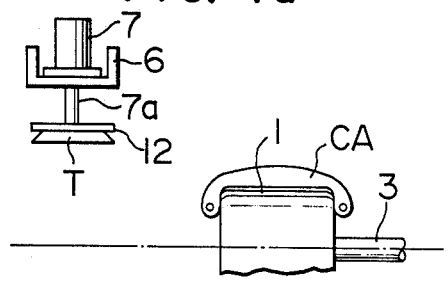
FIGS. 4a to 4j are diagrammatic views showing different phases of green tire building operation by the apparatus shown in FIG. 1.
Figure 4D:
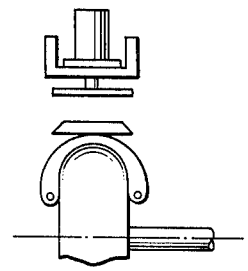
Figure 4B:
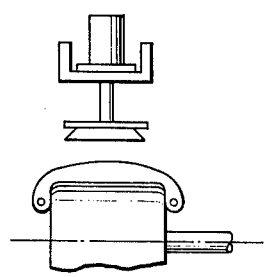
Figure 4E:
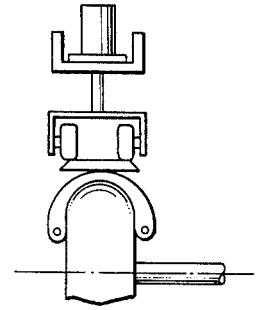
Figure 4C:
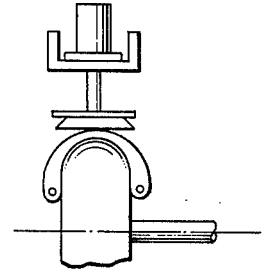
Figure 4F:
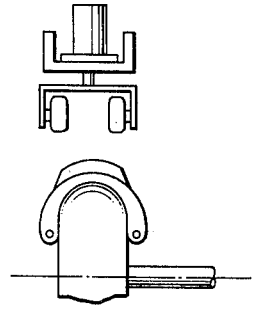
Figure 4G:
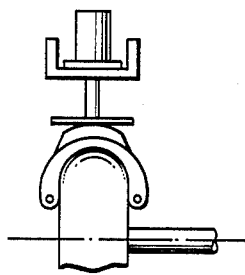
Figure 4H:
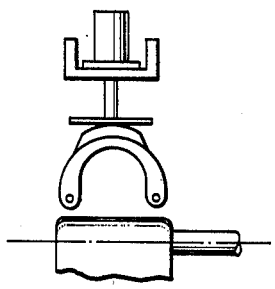
Figure 4I:
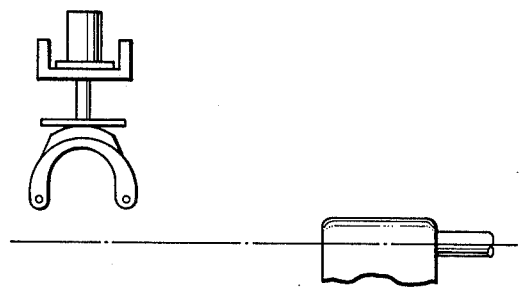
Figure 4J:
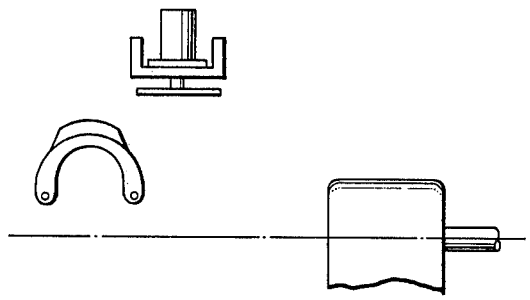

Referring now to the accompanying drawings and first to FIGS. 1 and 2, a tire building drum 1 is mounted on one end of a rotating shaft 3 which is rotatably supported at the other end on a housing 2. The rotating shaft 3 is driven for rotation from a motor (not shown) which is accommodated within the housing 2, through a suitable transmission mechanism. A pair of parallel spaced rails 4 and 4' are provided horizontally below the housing 2 to slidingly move therealong a carrier 5 which is connected to a suitble transfer mechanism (not shown). The carrier 5 is movable between an ejecting position and a final operating position indicated by phantom line respectively at A" and A' in FIG. 1.

As shown in FIG. 2, the carrier 5 includes a ring-shaped frame 6, four tread holding piston cylinders 7 positioned radially and at uniform spaced around the ring-shaped frame 6, and first to fourth roller operating piston cylinders 8 to 11 similarly positioned radially and at uniform spaced around the frame 6 between the respective tread holding piston cylinders 7. The ring-shaped frame 6 is provided around its circumference with a groove which has a bottom 6a of regular octagonal shape as seen in radial section. The tread holding piston cylinders 7 are securely mounted at the bottom 6a of the groove, on every other side of the octagon. Piston rods 7a of the respective cylinders 7 are passed through piston rod holes 6b which are bored radially through the bottom 6a of the octagonal groove. Each piston rod 7a has an arcuate holding member 12 fixedly secured to its inner end for holding from outside a tread T and a breaker BR which is closely applied on the inner side of the tread T or otherwise for holding a green tire G (see FIG. 3).

The first roller operating piston cylinder 8 is securely mounted on one side of the octagonal bottom 6a of the circumferential groove at a position between two adjacent tread holding piston cylinders 7 and has a piston rod 8a which is passed through a radial piston rod hole 6b and has a U-shaped bracket 14 fixedly secured to its extended inner end to rotatably support a first stitching roller 13 thereon through a pin member 15. The first roller operating piston cylinder 8, upon actuation, moves the first stitching roller 13 from an initial operating position indicated by full lines at B in FIG. 2 to a final operating position indicated by phantom line at B' or vice versa. stitching the tread T with the breaker BR along the mid-circumferential portion thereof. In a similar manner, the second roller operating piston cyclinder 9 is securely mounted on one side of the octagonal bottom 6a of the circumferential groove at a position between other two adjacent tread holding piston cylinder 7, and has a piston rod 9a which extends radially inwardly through a radial piston rod hole 6b. The piston rod 9a of the second roller operating piston cylinder 9 has a U-shaped bracket 18 securely mounted at its extended inner end for rotatably supporting thereon a pair of second stitching rollers 17 and 17' of truncated cone shape through pin members 19 and 19', respectively. The two rollers 17 and 17' have respective smaller diameter faces disposed inwardly to oppose each other. By the operation of the second roller operating piston cyclinder 9, the second stitching rollers 17 and 17' are likewise moved from an initial operating position C indicated by full line in FIG. 2 to a final operating position C' indicated by phantom line or vice versa, thereby to stitch opposite shoulder portions 20 and 20' of the tread T. Similarly to the first roller operating piston cylinder 8, the third roller operating piston cylinder 10 is fixedly mounted at the bottom 6a of the circumferential groove at a position between other two adjacent tread holding piston cylinder 7 and has a piston rod 10a which it extends radially inwardly through a radial piston rod hole 6b. The piston rod 10a of the thrid roller operating piston cylinder 10 has a U-shaped bracket 22 securely mounted at its extended innner end for rotatably supporting thereon a pair of third stitching rollers 21 and 21' of truncated cone shape through pin members 23 and 23', respectively. The third stitching rollers 21 and 21' of truncated cone shape have also the respective smaller diameter faces disposed inwardly to oppose each other. The third stitching rollers 21 and 21' have greater sectional areas than the above-mentioned second stitching rollers 17 and 17'. Upon actuation, the third roller operating piston cylinder 10 moves the third stitching rollers 21 and 21' from an initial operating position indicated by full line at D in FIG. 2 to a final operating position indicated by phantom line at D' or vice versa to stitch the tread portions 24 and 24' on the outer sides of the shoulder portions 20 and 20' thereof. Likewise, the fourth roller operating piston cylinder 11 is securely mounted on one side of the octagonal bottom 6a of the circumferential groove at a position between other two adjacent tread holding piston cylinders 7 and has a piston rod 11a which extends radially inwardly through a radial piston rod hole 6b. The piston rod 11a likewise has a U-shaped bracket 26 securely mounted at its extended inner end to support rotatably thereon a pair of fourth stitching rollers 25 and 25' of truncated cone shape through pin members 27 and 27', with the respective smaller diameter faces of the rollers 25 and 25' disposed inwardly to oppose each other. The fourth stitching rollers 25 and 25' have greater sectional areas than the third stitching rollers 21 and 21' mentioned above. Upon actuating the fourth roller operating piston cylinder 11, the fourth stitaching rollers 25 and 25' are moved from an initial operating position indicated by full line at E in FIG. 2 to a final operating position indicated by phantom line at E' or vice versa to stitch outer edge portions 28 and 28' of the thread T.

The stitching operation of the apparatus thus constructed and arranged will now be described hereinafter.

As shown in FIGS. 1, 2 and 4, tire components are firstly applied around the tire building drum 1 to form a carcass CA and then mounted on the carrier 5 is an annular tread T which has a breaker BR applied closely on the underside thereof. More particularly, the tread holding piston cyclinders 7 on the ring-shaped frame 6 are actuated by compressed air which is fed from a suitable compressed air source (not shown), thereby causing the holding members 12 to reach out to grip the tread T at four seaparate positions on the outer circumference thereof, fixing the latter in a predetermined position on the carrier 5 (see FIG. 4a). As shown particularly in FIGS. 1 and 2, the carrier 5 holding the annular tread T is moved along the rails 4 and 4' by the transfer mechanism mentioned hereinbefore, from the initial operating position indicated by full line at A to the final operating position indicated by phantom line at A'. As a result, the tread T surrounds the carcass CA which is formed on the tire building drum 1 with the mid-circumferential portion of the tread T being in registration with the circumferential center of the carcass CA (see FIG. 4b). The carcass CA is then deformed or shaped into a toroidal form by means of a shaping mechanism (not shown) which is mounted within the building drum 1 and assembled with the tread T on the carrier 5 (see FIG. 4c). In the next stage, the tread holding piston cylinders 7 are actuated again, in a reverse direction, to release the tread T, whereupon the tread T is handed over from the carrier 5 to the carcass CA and placed on the latter (see FIG. 4d). The tire building drum 1 which now carries the combined carcass Ca and tread T is then rotatingly driven from a motor through a suitable transmission mechanism as mentioned hereinbefore. In the succeeding phase of operation, the first roller operating piston cylinder 8 is actuated to move the first stitching roller 13 from the initial operating position B indicated by full line to the final operating position B' indicated by phantom line of FIG. 2 to stitch the mid-circumferential portion 16 of the tread T. Upon a lapse of a predetermined time period after actuation of the first roller operating piston cylinder 8, the second roller operating piston cylinder 9 is actuated to move the second stitching rollers 17 and 17' from the initial operating position C indicated by full line to the final operating position C' indicated by phantom line in FIG. 2. The operations of the first and second stitching rollers 13, 17 and 17' are overlapped for a certain period of time so that the second stitching rollers 17 and 17' stitch the shoulder portions 20 and 20' on opposite sides of the mid-circumferential portion 16 of the tread T which has just been stitched by the first stitching roller 13. At the end of the time period of overlapping operation, the first roller operating piston cylinder 8 is actuated again, in a reverse direction, to return the first stitching roller 13 from the final oprating position B' indicated by phantom line to the initial operating position B indicated by full line in FIG. 2. Upon a lapse of a predetermined time period after actuation of the second roller operating piston cylinder 9, the third roller opeating piston cylinder 10 is actuated to urge the third stitching rollers 21 and 21' from the initial operating position D indicated by full line to the final operating D' indicated by phantom line in FIG. 2. The third stitching rollers 21 and 21' are brought to the projected operating position in an overlapping timing relative to the second rollers 17 and 17', stitching the tread portions 24 and 24' on the outer sides of the shoulder portions 20 and 20' which have just been stitched by the second rollers 17 and 17' (see FIG. 4e). At the end of the time period of overlapping operation, the second roller operating piston cylinder 9 is actuated again, in a reverse direction, to return the second stitching rollers 17 and 17' from the final operating position C' indicated by full line to the initial operating position C indicated by full line in FIG. 2 (see FIG. 4f). Upon a lapse of a predetermined time period after actuation of the third roller operating piston cylinder 9, the fourth roller operating piston cylinder 11 is actuated to move the fourth stitching rollers 25 and 25' from the initial operating position E indicated by full line to he final operating position E' indicated by phantom line in FIG. 2. The fourth roller operating piston cylinder 11 is actuated likewise in a suitable timing to operate the fourth stitching rollers 25 and 25' in overlapping relation with the third stitching rollers 21 and 21', stitching side edge portions 28 and 28' of the thread T on the outer sides of the tread portions 24 and 24' which have been stitched by the third rollers 21 and 21'. At the end of a predetermined overlapping time period, the third roller operating piston cylinder 10 is actuated again, in a reverse direction, to return the hird stitching rollers 21 and 21' from the final operating position D' indicated by phantom line to the initial operating position D indicated by full line in FIG. 2. Upon a lapse of a further predetermined time period, the fourth roller operating piston cylinder 11 is actuated again, in a reverse direction, to return the fourth stitching rollers 25 and 25' from the final operating position E' indicated by phantom line to the initial operating position E indicated by full line in FIG. 2. As soon as the fourth stitching rollers 25 and 25' are returned to the outer rest position, the motor is switched off to stop the rotation of the tire building drum 1, thus producing a green tire G.

In this manner, the tread T is completely stitched with the carrier 5 positioned around the circumference of the tire building drum 1. The tread holding piston cylinders 7 on the ring-shaped frame 6 are actuated again by compressed air which is fed from the aforementioned compressed air source, reaching out the holding members 12 to grip the green tire G at four separate positions on the circumference thereof (see FIG. 4g). In the next phase of operation, the tire building drum 1 is contracted to have a reduced diameter, handing over the green tire G to the holding members 12 (see FIG. 4h). The aforementioned transfer mechanism is then actuated again to move the carrier 5 with the green tire G along the rails 4 and 4' from the final oprating position A' indicated by phantom line to the final ejecting position A" indicated by phantom line in FIG. 1. At this instance, the green tire G is removed out of the tire building drum 1 without being contacted or otherwise interfered by the latter (see FIG. 4i). As soon as the carrier 5 reaches the ejecting position A", the tread holding piston cylinders 7 are operated again to retract the holding members 12, thereby releasing and ejecting the green tire G from the carrier 5. After ejection of the green tire G, the transfer mechanism is actuated again to transfer the empty carrier 5 from the ejecting position A" indicated by phantom line to the initial operating position A indicated by full line in FIG. 1. In the meantime, the tire building drum 1 is expanded again to have an enlarged diameter for application therearound of tire components (see FIG. 4j).

By the sequential operations described above, a tread T which has a breaker BR closely on its inner side is transferred by the carrier 5 and brought around a carcass CA which is formed on a tire building drum 1, with the carrier 5 positioned around the circumference of the tire building drum 1, the tread T is completely stitched by first to fourth stitching rollers which are mounted on the carrier 5 to act on different portions of the tread T, and a completely stitched green tire G is finally removed out of the tire building drum 1 by the carrier 5. Of course, these green tire producing operations may be carried out automatically by actuating and de-actuating the motor, transfer mechanism, tread holding piston cylinders 7, first to fourth roller operating piston cylinders, and expansion and contraction of the tire building drum 1 according to a predetermined program.

There are not particularrestrictions on the material to be used for the above-mentioned stitching rollers. Namely, the stitching rollers may be either of a metal or of a resilient material like the pneumatic tire rollers. If desired, rollers of a metal and a resilient material may be employed in combination. The carrier 5 should have at least one stitching roller mounted thereon and may be provided with such rollers in a number greater than in the particular embodiment shown herein. Alternatively, sidewardly movable rollers may be provided on the carrier 5 to symmetrically be movable on opposite sides of the mid-circumferential plane of the tire building drum 1 as in the conventional green tire producing apparatus. On the contrary, fixed type stitching rollers may be mounted on carrier frames which are movable toward and away from each other on opposide sides of the midcircumferential plane of the tire building drum.

It will be understood from the foregoing description that, according to the invention, the stitching mechanism is provided on the carrier which transfers a breaker and a tread to and around the circumference of a carcass on a tire building drum and removes a completely stitched green tire out of the building drum and transfers it to an ejecting position. The stiching operation can thus be carried out with the carrier still in the position around the circumference of the building drum. This obviates the necessity for providing a stitching mechanism separately from the building drum and carrier as in the conventional tire building apparatus and contributes to reduce the operational time per unit tire to a considerable degree.

Although the invention has been illustrated and described in conjunction with a single preferred embodiments thereof, it is to be understood that various changes and modifications may be resorted to without departing from the spirit and scope of the invention.

What is claimed is:

1. An apparatus for building green tires, comprising:
   a tire building drum rotatably mounted on a housing and driven for rotation by a motor accommodated in said housing; a ring-shaped frame movable toward and away from an operating position where said ring-shaped frame surrounds the circumference of said tire building drum;
   tire component holding means including a plurality of tire component holders radially movably mounted on said ring-shaped frame at uniform space from each other for releasably holding a breaker-tread assembly during a green tire producing stage and a green tire after said green tire producing stage; and
   stitching means including a plurality of rotatable stitching rollers mounted on said ring-shaped frame in alternate relation with said tire component holders and movable toward and away from said tire building drum for stitching said breaker-tread assembly into tight contact with said carcass on said tire building drum while said ring-shaped frame is in said operation position.

2. An apparatus as set forth in claim 1, wherein said ring-shaped frame has a circumferential groove formed on the outer periphery thereof and said tire component holding means further includes a plurality of piston cylinders circumferentially mounted at uniform space on the bottom of said circumferential groove in said ring-shaped frame and each having a radially inwardly projecting piston rod slidably engaged with each of radial holes formed in the ring-shaped frame and carrying an arcuate holding member at the extended inner end of said piston rod.

3. An apparatus as set forth in claim 2, wherein said stitching means further includes a plurality of piston cyliners circumferentially mounted on the bottom of said circumferential groove between said piston cylinders of said tire component holding means and each having a radially inwardly projecting piston rod slidably engaged with each of radial holes formed in the ring-shaped frame, one of said piston rod of said piston cylinder having at its inner end said rotatable stitching roller for stitching the mid-circumferential portion of said breaker-tried assembly into tight contact with said carcass, and one or more remaining piston rods of said piston cylinders each having a pair of said rotatable stitching rollers for stitching the outer sides of said mid-circumferential portion of said breaker-tread assembly into tight contact with said carcass.

* * * * *